UNITED STATES PATENT OFFICE.

FRIEDRICH RUNKEL AND MARTIN HERZBERG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

DISAZO DYE.

932,812.  Specification of Letters Patent.  Patented Aug. 31, 1909.

No Drawing.  Application filed April 16, 1909. Serial No. 490,226.

*To all whom it may concern:*

Be it known that we, FRIEDRICH RUNKEL and MARTIN HERZBERG, doctors of philosophy, chemists, citizens of the German Empire, residing at Elberfeld, Germany, have invented new and useful Improvements in New Azo Dyes, of which the following is a specification.

Our invention relates to the manufacture and production of new azo dyes which can be obtained by combining the diazo compounds of one molecule of an aminophenyltolylether of the formula: $NH_2.C_6H_4—OC_6H_4.CH_3$ and one molecule of another diazo compound with one molecule of an 1.8-aminonaphthol sulfonic acid. The new dyestuffs thus obtained are after being dried and pulverized dark powders soluble in water. Upon reduction with stannous chlorid and hydrochloric acid they are decomposed an aminophenyltolylether, an amino compound and a diamino-1.8-aminonaphthol sulfonic acid are obtained.

The new coloring matters dye wool from blue to green to black shades remarkable for their fastness to washing and to milling.

In order to carry out our process we can *e. g.* proceed as follows, the parts being by weight: 23.1 parts of para-aminobenzene sulfonic acid (sodium salt containing 2 molecules of water of crystallization) are dissolved in 200 parts of water, ice is added and the free aminobenzene sulfonic acid is precipitated with 42 parts of crude hydrochloric acid and is then diazotized with 7.1 parts of sodium nitrite, 23.9 parts of freshly precipitated 1.84-aminonaphthol-4-sulfonic acid are added to the mass of the reaction which has to be stirred until all will be entered into solution. After it has been rendered alkaline with sodium carbonate the diazo compound of 19.9 parts of ortho-aminophenyl-ortho-tolylether:

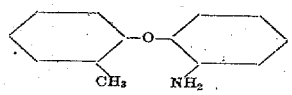

are added. After some time the dye is salted out, filtered off, redissolved from hot water, filtered off, pressed and dried. It is after being dried and pulverized in the shape of its sodium salt a dark powder soluble in water with a dark blue and soluble in concentrated sulfuric acid with a bluish-green color; yielding upon reduction with stannous chlorid and hydrochloric acid para-aminobenzene sulfonic acid, ortho-aminophenyl-ortho-tolylether and 1.2.7-triamino-8-naphthol-4-sulfonic acid.

The new coloring matter dyes wool blue-black shades fast to washing and to milling.

The process is carried out in an analogous manner for the production of other of the above mentioned dyestuffs *e. g.* from 1.8-aminonaphthol-3.6- or 4.6-disulfonic acid etc. and other aminophenyltolylethers *e. g.* ortho-aminophenyl-meta- or para-tolylether, para-aminophenyl-ortho, meta- or para-tolylether, or on using other diazo compounds *e. g.* the diazo compounds of: dichloro-anilin, 4-chloroanilin-2-sulfonic acid, para-toluidin-meta-sulfonic acid, ortho- or para-chloroanilin, para-nitranilin, meta-nitranilin, para- or ortho-toluidin, anilin, 1-methyl-2-amino-4-nitrobenzene, 1-naphthylamin, etc.

We claim:

1. The herein described new disazo dyestuffs obtainable from 1 molecule of a diazotized aminophenyltolyl-ether, 1 molecule of another diazo compound and 1 molecule of an 1.8-aminonaphthol-sulfonic acid, which are after being dried and pulverized in the shape of their sodium salts dark powders soluble in water; yielding upon reduction with stannous chlorid and hydrochloric acid an aminophenyltolylether, another amino compound and a diamino-1.8-aminonaphthol sulfonic acid; and dyeing wool from acid baths from blue to green to black shades remarkable for their fastness to washing and to milling, substantially as described.

2. The herein described new disazo dyestuff obtainable from diazotized ortho-aminophenyl-ortho-tolylether, diazotized para-aminobenzene sulfonic acid and 1.8-aminonaphthol-4-sulfonic acid, which dye is after being dried and pulverized in the shape of its sodium salt a dark powder soluble in water with a dark blue and soluble in concentrated sulfuric acid with a bluish-green color; yielding upon reduction with stannous chlorid and hydrochloric acid para-aminobenzene sulfonic acid, ortho-aminophenyl-ortho-tolylether and 1.2.7-triamino-8-naphthol-4-sulfonic acid; and dyeing wool blue-black shades remarkable for their fastness to washing and to milling, substantially as described.

In testimony whereof we have hereunto set our hands in the presence of two subscribing witnesses.

FRIEDRICH RUNKEL. [L. S.]
MARTIN HERZBERG. [L. S.]

Witnesses:
OTTO KÖNIG,
C. J. WRIGHT.

---

Correction in Letters Patent No. 932,812.

It is hereby certified that in Letters Patent No. 932,812, granted August 31, 1909, upon the application of Friedrich Runkel and Martin Herzberg, of Elberfeld, Germany, for an improvement in "Disazo Dyes" an error appears in the printed specification requiring correction as follows: Page 1, line 37, the figures and words "1.84-aminonaphthol-4-sulfonic" should read *1.8-aminonaphthol-4-sulfonic;* and that the said Letters Patent should be read with this correction therein that the same may conform to the record of the case in the Patent Office.

Signed and sealed this 2nd day of November, A. D., 1909.

[SEAL.]

C. C. BILLINGS,
*Acting Commissioner of Patents.* chlorid and hydrochloric acid para-aminobenzene sulfonic acid, ortho-aminophenyl-ortho-tolylether and 1.2.7-triamino-8-naphthol-4-sulfonic acid; and dyeing wool blue-black shades remarkable for their fastness to washing and to milling, substantially as described.

In testimony whereof we have hereunto set our hands in the presence of two subscribing witnesses.

FRIEDRICH RUNKEL. [L. S.]
MARTIN HERZBERG. [L. S.]

Witnesses:
OTTO KÖNIG,
C. J. WRIGHT.

---

Correction in Letters Patent No. 932,812.

It is hereby certified that in Letters Patent No. 932,812, granted August 31, 1909, upon the application of Friedrich Runkel and Martin Herzberg, of Elberfeld, Germany, for an improvement in "Disazo Dyes" an error appears in the printed specification requiring correction as follows: Page 1, line 37, the figures and words "1.84-aminonaphthol-4-sulfonic" should read *1.8-aminonaphthol-4-sulfonic;* and that the said Letters Patent should be read with this correction therein that the same may conform to the record of the case in the Patent Office.

Signed and sealed this 2nd day of November, A. D., 1909.

[SEAL.]

C. C. BILLINGS,
*Acting Commissioner of Patents.*

It is hereby certified that in Letters Patent No. 932,812, granted August 31, 1909, upon the application of Friedrich Runkel and Martin Herzberg, of Elberfeld, Germany, for an improvement in "Disazo Dyes" an error appears in the printed specification requiring correction as follows: Page 1, line 37, the figures and words "1.84-aminonaphthol-4-sulfonic" should read *1.8-aminonaphthol-4-sulfonic;* and that the said Letters Patent should be read with this correction therein that the same may conform to the record of the case in the Patent Office.

Signed and sealed this 2nd day of November, A. D., 1909.

[SEAL.]

C. C. BILLINGS,
*Acting Commissioner of Patents.*